US012173886B2

(12) United States Patent
Takahashi

(10) Patent No.: US 12,173,886 B2
(45) Date of Patent: Dec. 24, 2024

(54) SHEET CONVEYANCE APPARATUS, IMAGE FORMING APPARATUS, AND IMAGE FORMING SYSTEM

(71) Applicant: CANON KABUSHIKI KAISHA, Tokyo (JP)

(72) Inventor: Hiroyuki Takahashi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/459,832

(22) Filed: Sep. 1, 2023

(65) Prior Publication Data

US 2024/0077197 A1 Mar. 7, 2024

(30) Foreign Application Priority Data

Sep. 7, 2022 (JP) ................................ 2022-142112

(51) Int. Cl.

*F21V 33/00* (2006.01)
*B65H 5/02* (2006.01)
*G03G 15/00* (2006.01)
*G03G 21/16* (2006.01)

(52) U.S. Cl.

CPC ......... *F21V 33/0048* (2013.01); *B65H 5/021* (2013.01); *G03G 15/70* (2013.01); *G03G 21/16* (2013.01); *G03G 21/1609* (2013.01); *G03G 21/1614* (2013.01); *G03G 21/1619* (2013.01); *G03G 21/1633* (2013.01); *G03G 21/1695* (2013.01); *B65H 2402/45* (2013.01); *B65H 2801/06* (2013.01)

(58) Field of Classification Search

CPC .... G03G 15/70; G03G 21/16; G03G 21/1609; G03G 21/1614; G03G 21/1619; G03G 21/1633; G03G 21/1695; F21V 33/0048; B65H 5/021; B65H 2402/45; B65H 2801/06

See application file for complete search history.

(56) References Cited

U.S. PATENT DOCUMENTS

| | | | | |
|---|---|---|---|---|
| 2012/0230747 | A1* | 9/2012 | Cole | G03G 21/1695 400/582 |
| 2022/0017319 | A1* | 1/2022 | Machii | B65H 5/062 |
| 2022/0219470 | A1* | 7/2022 | Bhide | F21V 7/06 |

FOREIGN PATENT DOCUMENTS

| | | | |
|---|---|---|---|
| JP | 2003241454 | A | 8/2003 |
| JP | 2011011838 | A | 1/2011 |
| JP | 2017142478 | A | 8/2017 |

* cited by examiner

*Primary Examiner* — Joseph S Wong
(74) *Attorney, Agent, or Firm* — ROSSI, KIMMS & McDOWELL LLP

(57) ABSTRACT

A sheet conveyance apparatus includes an apparatus body including a first guide configured to form a conveyance path along which a sheet to be conveyed is guided, an opening/closing member including a second guide disposed opposite the first guide and configured to form the conveyance path, the opening/closing member being openable and closable with respect to the apparatus body around a rotation axis, a light source configured to emit light, and a reflection unit configured to reflect light from the light source. The light source and the reflection unit are disposed such that, in an open state where the opening/closing member is open to expose the conveyance path, the first guide is irradiated, in a direction from a side farther from the rotation axis to a side closer to the rotation axis, with the light reflected by the reflection unit.

14 Claims, 10 Drawing Sheets

SHEET CONVEYANCE APPARATUS, IMAGE FORMING APPARATUS, AND IMAGE FORMING SYSTEM

BACKGROUND OF THE INVENTION

Field of the Invention

The present technology relates to a sheet conveyance apparatus, an image forming apparatus, and an image forming system, all of which include an opening/closing member that opens or closes with respect to an apparatus body thereof.

Description of the Related Art

Image forming apparatuses, such as copying machines or printers, include a sheet conveyance unit that conveys sheets on which images are to be formed by an image forming unit. In this sheet conveyance unit, a sheet may be jammed (or a sheet jam may occur). In such cases, a user needs to open the opening/closing member, such as a door, of the image forming apparatus and remove the jammed sheet. However, depending on the site of the image forming apparatus, a sheet may be jammed inside a dark area. JP 2003-241454 A discloses an image forming apparatus that includes a lamp disposed in a lower conveyance unit (510) below a conveyance path unit. When the user removes a jammed sheet after having pulled out the conveyance path unit and opened the lower conveyance unit, for example, this lamp helps the user view the jammed paper.

JP 2011-11838 A discloses another image forming apparatuses to which a processing device such as a finisher may be attached as an option unit to constitute an image forming system. This image forming system disclosed in JP 2011-11838 includes a reverse unit close to a processing device in the image forming apparatus in order to reverse the front and back surface of a sheet. Even in a conveyance path within this reverse unit or another conveyance path leading to the reverse unit, for example, a sheet jam may also occur. When a sheet jam occurs at such a site, the user needs to remove the jammed sheet by opening the door on the side surface adjacent to the processing device in the image forming apparatus. However, the processing device disposed adjacent to the side surface of the image forming apparatus may block external light even if the user opens the door on the side surface. As a result, the sheet conveyance path might be still dark. JP 2017-142478 A discloses further another image forming apparatus that includes an illumination device disposed on a door of a side surface thereof.

Disadvantageously, in the image forming apparatus disclosed in JP 2003-241454 A, the lamp is disposed on the back side of the lower conveyance unit that opens with respect to the conveyance path unit. Likewise, in the image forming apparatus disclosed in JP 2017-142478 A, the illumination device is disposed on the back side of the door. Thus, when the user opens the lower conveyance unit or the door, a portion of the conveyance path (conveyance guide) is irradiated with the light from the back. In this case, the user may be unable to clearly view, especially a portion of the conveyance path on the back side of the irradiated portion because this portion is dark due to backlighting. As a result, the user may have trouble removing a jammed sheet and thus may fail to remove it promptly or completely.

The present technology provides a sheet conveyance apparatus, an image forming apparatus, and an image forming system, all of which can provide improved visibility during a sheet jam removal process.

SUMMARY OF THE INVENTION

According to a first aspect of the present invention, a sheet conveyance apparatus includes an apparatus body including a first guide configured to form a conveyance path along which a sheet to be conveyed is guided, an opening/closing member including a second guide disposed opposite the first guide and configured to form the conveyance path, the opening/closing member being openable and closable with respect to the apparatus body around a rotation axis, a light source configured to emit light, and a reflection unit configured to reflect light from the light source.

The light source and the reflection unit are disposed such that, in an open state where the opening/closing member is open to expose the conveyance path, the first guide is irradiated, in a direction from a side farther from the rotation axis to a side closer to the rotation axis, with the light reflected by the reflection unit.

According to a second aspect of the present invention, a sheet conveyance apparatus includes an apparatus body including a first guide configured to form a conveyance path along which a sheet to be conveyed is guided, an opening/closing member including a second guide disposed opposite the first guide and configured to form the conveyance path, the opening/closing member being openable and closable with respect to the apparatus body, a light source configured to emit light, a reflection unit configured to reflect the light from the light source, and an operation unit configured to receive an operational input of information, the operation unit being disposed in a front portion of the apparatus body. In an open state where the opening/closing member is open to expose the conveyance path, the first guide is irradiated, in a direction from a front side to a back side of the apparatus body, with the light reflected by the reflection unit.

Further features of the present invention will become apparent from the following description of exemplary embodiments with reference to the attached drawings.

DESCRIPTION OF THE EMBODIMENTS

First Embodiment

Outline of Image Forming System

Figure 1:
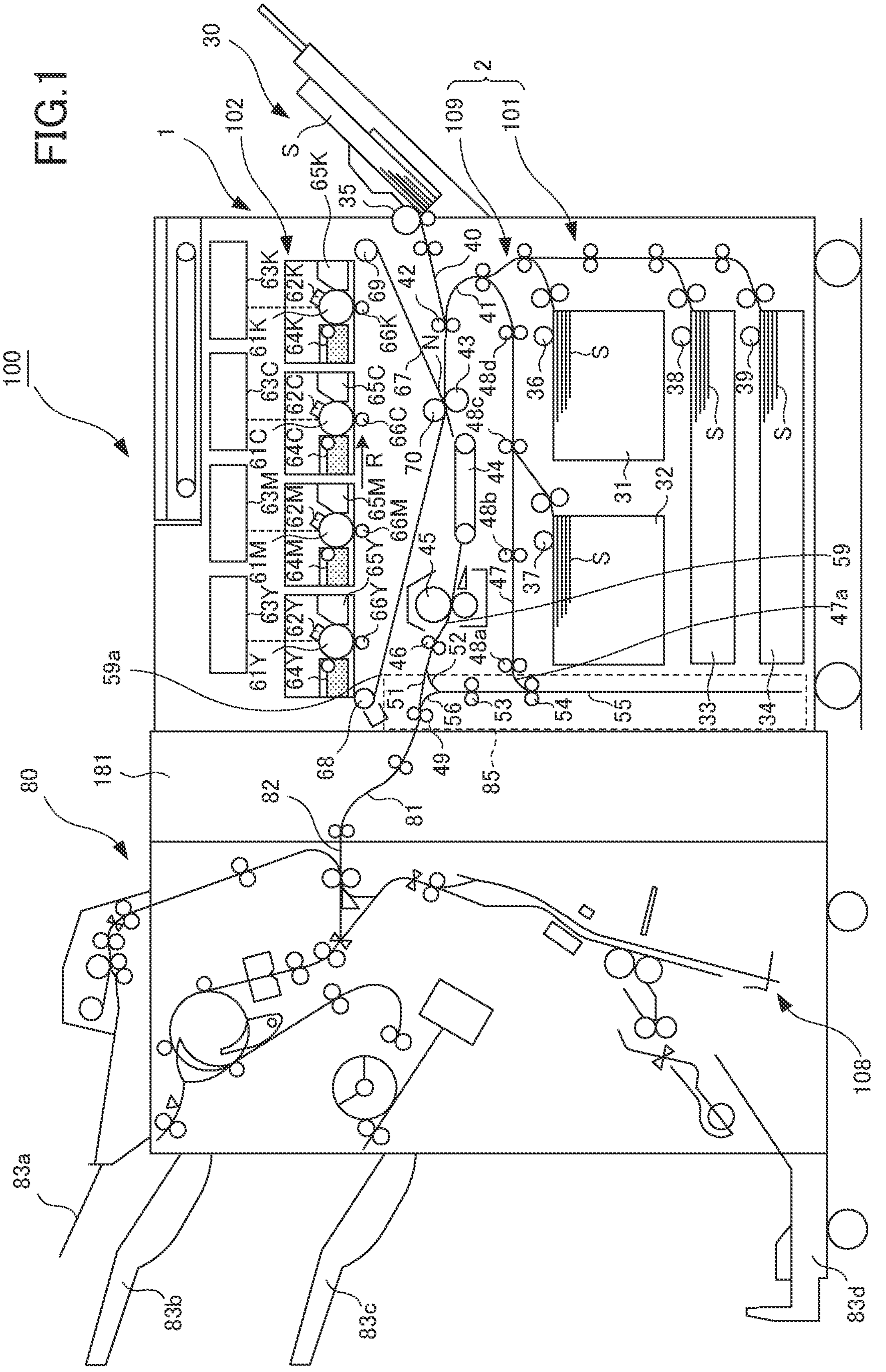
FIG. 1 is a schematic cross-sectional view of an image forming system according to a first embodiment.
Figure 2:
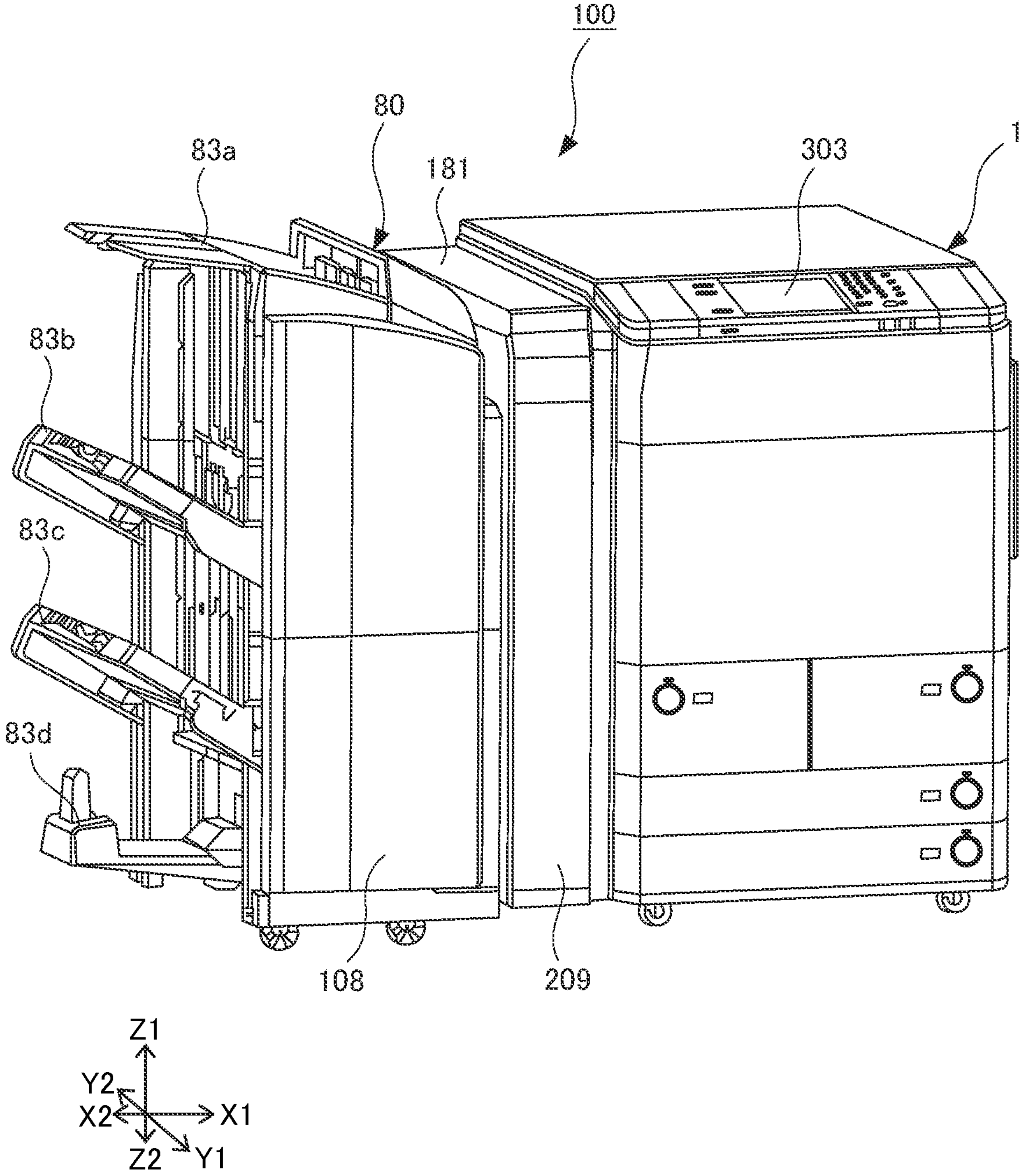
FIG. 2 is an overall perspective view of the image forming system according to the first embodiment.

A first embodiment will be described below with reference to FIGS. 1 to 8C. First, a schematic configuration of an image forming system according to the first embodiment will be described with reference to FIGS. 1 and 2. FIG. 1 is a schematic cross-sectional view of the image forming system according to the first embodiment. FIG. 2 is an overall perspective view of an image forming system according to the first embodiment.

The image forming system 100 includes: an image forming apparatus 1; and a finisher 80 as an optional unit that serves as a processing device. In other words, the image forming system 100 is configured such that the finisher 80 that processes a sheet discharged from the image forming apparatus 1 is connected to a downstream side of the image forming apparatus 1 in a sheet conveyance direction. In the first embodiment, the image forming apparatus 1 may be a color image forming apparatus that utilizes an electrophotographic system. More specifically, in the present embodiment, the image forming apparatus 1 advantageously employs an intermediate transfer tandem system in which image forming units using four colors are arranged side by side above an intermediate transfer belt, in terms of excellent adaptability to various sheets and print productivity. In the present embodiment, the finisher 80, which serves as the processing device, has a function of processes, such as stapling and saddle stitching. After the image forming apparatus 1 has formed an image on a sheet and discharged this sheet, the finisher 80 receives and processes it.

Sheets used as recording media in both the image forming apparatus 1 and the finisher 80 may be various sheets, examples of which include paper such as a paper sheet and an envelope, glossy paper, a plastic film such as a sheet for an overhead projector, and cloth.

Configuration of Image Forming Apparatus

The image forming apparatus 1 includes: a sheet feeding unit 101 that feeds a sheet S; and a sheet conveyance unit 109 that conveys the sheet S fed by the sheet feeding unit 101. In the present embodiment, both the sheet feeding unit 101 and the sheet conveyance unit 109 constitute a sheet conveyance apparatus 2. The image forming apparatus 1 also includes an image forming unit 102 that forms an image on the sheet S being conveyed by the sheet conveyance unit 109.

The sheet feeding unit 101 includes: a manual feed tray 30 as a sheet stacking unit in which a plurality of sheets can be stacked on a tray being open with respect to a side surface of the image forming apparatus 1; and feed cassettes 31, 32, 33, and 34 as sheet storage units in each of which a plurality of sheets can be stacked and stored. The sheet feeding unit 101 also includes: a feed roller 35 as a feeding member that feeds the uppermost one of sheets stacked on the manual feed tray 30; and feed rollers 36, 37, 38, and 39 as feeding members that feed, respectively, the uppermost ones of sheets stacked on the feed cassettes 31, 32, 33, and 34.

The image forming unit 102 includes: photosensitive members 61 (61Y, 61M, 61C, 61K); charging devices 62 (62Y, 62M, 62C, 62K); exposing units 63 (63Y, 63M, 63C, 63K); and developing units 64 (64Y, 64M, 64C, 64K). The image forming unit 102 also includes primary transfer units 66 (66Y, 66M, 66C, 66K); and photosensitive member cleaners 65 (65Y, 65M, 65C, 65K). The image forming unit 102 also includes: an intermediate transfer belt 67 to which toner images formed on the photosensitive members 61Y, 61M, 61C, and 61K are primarily transferred; and a secondary transfer roller 43 that serves as a secondary transfer device that transfers the toner images that have been transferred to the intermediate transfer belt 67 to the sheet S. The intermediate transfer belt 67 is tightened by a drive roller 68 serving as a stretching roller, a tension roller 69, a secondary transfer inner roller 70, and some rollers and is driven (moved) in an arrow R direction (clockwise) in FIG. 1. The image forming unit 102 includes a fixing unit 45 that fixes the images onto the sheet S to which the toner images have been transferred.

The sheet conveyance unit 109 includes supply conveyance paths 40 and 41, which are sheet conveyance paths through which the sheet S fed by the feed rollers 35 to 39 of the sheet feeding unit 101 passes. The sheet conveyance unit 109 also includes a resist roller 42 that feeds the sheet S to a secondary transfer unit (secondary transfer nip) N, which serves as a contact portion between the intermediate transfer belt 67 and the secondary transfer roller 43. The sheet conveyance unit 109 also includes a pre-fixing conveyor belt 44 that sends, to the fixing unit 45, the sheet S to which the toner images have been transferred. Disposed downstream of the fixing unit 45 is a post-fixing conveyance path 59 provided with an inside discharge roller 46. The sheet conveyance unit 109 also includes a reverse unit 85 that switchback-conveys the sheet S to the downstream side of the post-fixing conveyance path 59 in the conveyance direction of the sheet S. The post-fixing conveyance path 59 leads to the reverse unit 85 via an outlet 59*a* of the post-fixing conveyance path 59, which extends substantially horizontally.

The reverse unit 85 includes a discharge conveyance path 51, a reverse guide path 52, a switchback path 55, and a reverse discharge path 56. The discharge conveyance path 51, which is coupled at its upstream end in the conveyance direction to the post-fixing conveyance path 59, serves as a sheet conveyance path along which the sheet S on which the image has been formed and will be discharged from the image forming apparatus 1 is guided. The reverse guide path 52, which is coupled at its upstream end in the conveyance direction to the post-fixing conveyance path 59, serves as a sheet conveyance path branched from the discharge conveyance path 51. The switchback path 55 serves as a sheet conveyance path into which the sheet that has passed through the reverse guide path 52 is drawn, in order to maintain the orientations of the front and back surfaces and leading and trailing edges, in the conveyance direction, of the sheet S on which the image has been formed. The reverse discharge path 56 serves as a sheet conveyance path which merges with the discharge conveyance path 51 and along which the sheet S that has been drawn into the switchback path 55 and will be discharged from the image forming apparatus 1 is guided. The reverse unit 85 includes an upper reverse roller pair 53 and a lower reverse roller pair 54, each of which serves as a conveyance member disposed in the switchback path 55. The reverse unit 85 also includes an outside discharge roller 49 that conveys the sheet S discharged from the fixing unit 45.

The sheet conveyance unit 109 also includes a double-sided conveyance path 47, which serves as a sheet conveyance path along which the sheet S has been conveyed in the opposite direction by the switchback path 55 of the reverse unit 85 is conveyed. The switchback path 55 is coupled to the double-sided conveyance path 47 via an inlet 47*a* of the double-sided conveyance path 47, which extends substantially horizontally. The double-sided conveyance path 47 is coupled to the supply conveyance path 41. The sheet conveyance unit 109 also includes double-sided rollers 48*a*, 48*b*, 48*c*, and 48*d* that convey the sheet S so as to pass through the double-sided conveyance path 47.

As illustrated in FIG. 2, disposed in an upper front portion of the image forming apparatus 1 is an operation screen 303, which serves as an operation unit. The operation screen 303 has a function of a display device that displays information regarding the image forming apparatus 1 and also an input device that receives an operational input of information, such as various settings, in the image forming apparatus 1.

It should be noted that the side of the image forming apparatus 1 on which the operation screen 303 is disposed and faces corresponds to the front side thereof, which faces an operator when he/she is operating the image forming apparatus 1. In addition, the side of the image forming apparatus 1 which is opposite to that on which the operation screen 303 is disposed corresponds to the back surface. The image forming apparatus 1 may be designed based on the assumption that the back surface is positioned close to a wall inside a space, such as a room, in which the image forming apparatus 1 is installed. The right surface (as viewed from the operator) of the image forming apparatus 1 in the present embodiment faces in the arrow X1 direction in FIG. 2. Likewise, the left surface faces the arrow X2 direction; the front direction faces in the arrow Y1 direction; the back direction faces in the arrow Y2 direction; the upper surface faces in the arrow Z1 direction; and the lower surface faces in the arrow Z2 direction. The front surface of the image forming apparatus 1 corresponds to the front side as viewed from the operator or a service person, whereas the back surface corresponds to the back side. The image forming apparatus 1 (image forming system 100) is usually installed and operates such that the front and back surfaces thereof face in a substantially horizontal direction (a direction substantially orthogonal to the gravity direction). In general, the upper and lower surfaces correspond to, respectively, those in the direction of gravity (vertical direction); however, they do not necessarily have to mean only the exact upper and lower directions and may imply an upper side and a lower side with respect to a horizontal plane passing through a target element or location. In the sheet conveyance path, the sheet conveyance direction corresponds to a plane direction orthogonal to the front or back direction, and the width direction of the sheet orthogonal to the sheet conveyance direction corresponds to the front or back direction (near-far direction). Each of the front and back directions is substantially parallel to the rotation axis of each of the rollers 68 to 70 for the photosensitive members 61 and the intermediate transfer belt 67.

Configuration of Finisher

As illustrated in FIGS. 1 and 2, the finisher 80 includes: a buffer path unit 181 that conveys the sheet S discharged from the image forming apparatus 1; and a processing unit 108 that processes the sheet S conveyed by the buffer path unit 181. The buffer path unit 181 includes a buffer path 81 as a conveyance path along which the sheet S is conveyed and guided to the processing unit 108, which serves as a finisher body. The buffer path 81 is coupled to the downstream end, in the conveyance direction of the sheet S, of the discharge conveyance path 51 in the image forming apparatus 1. The finisher 80 also includes discharge stacking units 83*a*, 83*b*, 83*c*, and 83*d* to which the sheet S processed by the processing unit 108 is to be discharged. In this case, both the buffer path unit 181 and the processing unit 108 may be separate units; the image forming apparatus 1 may be coupled to the processing unit 108 via the buffer path unit 181.

Sheet Conveyance Process

The sheets S are stacked on each of the manual feed tray 30 and the feed cassette 31 to 34 described above and fed, respectively, by the feed rollers 35 to 39 in accordance with an image forming timing in the image forming unit 102. After a sheet S has been fed by any one of the feed rollers 35 to 39, the sheet S is conveyed along the supply conveyance path 40 or the supply conveyance path 41 and reaches the resist roller 42.

When abutting on the resist roller 42, the sheet S becomes looped. As a result, the entire leading edge of sheet S is brought into contact with the resist roller 42, so that the skew of sheet S is corrected. After having corrected the skew of sheet S, the resist roller 42 feeds the sheet S to the secondary transfer unit N at a timing related to that of forming an image on the sheet S. More specifically, the resist roller 42 conveys the sheet S to the secondary transfer unit N in accordance with the timing at which the toner images are borne by the intermediate transfer belt 67 serving as an image bearing member reaches the secondary transfer unit N.

The secondary transfer unit N serves as a nip portion that transfers the toner image to the sheet S. The toner image is formed by both the secondary transfer inner roller 70 and the secondary transfer roller 43, which are disposed opposite each other with the intermediate transfer belt 67 therebetween. The secondary transfer unit N is subjected to a predetermined pressure and an electrostatic load bias, so that the toner image is transferred (secondary transferred) onto the sheet S.

Image Forming Process

A description will be given below of an image forming process, which is to be performed simultaneously with the above sheet conveying process performed by the secondary transfer unit N and its upstream members. First, the surfaces of the photosensitive members 61 that are rotating are uniformly charged by the respective charging devices 62. The charged surfaces of the photosensitive members 61 are then scanned and exposed by the respective exposing units 63. Each exposing unit 63 is driven based on a signal in the received image information. In this way, electrostatic latent images (electrostatic images) are formed on the respective photosensitive members 61. The electrostatic latent images formed on the photosensitive members 61 are developed (visualized) by the respective developing units 64 using toner as a developer. In this way, toner images are formed on the respective photosensitive members 61. The toner images on the photosensitive members 61 are subjected to a predetermined welding pressure and electrostatic load bias by the respective primary transfer units 66, so that the toner images are transferred (primarily transferred) onto the intermediate transfer belt 67. After the primary transfer step has been performed, some toner (residual transfer toner) that has been slightly left on the photosensitive members 61 is removed and collected therefrom by the respective photosensitive member cleaners 65.

During the forming of a full-color image, the above image forming process is performed for each of yellow (Y), magenta (M), cyan (C), and black (K). Further, the toner images in the colors Y, M, C, and K formed on the respective photosensitive members 61 are transferred onto the intermediate transfer belt 67 so as to be superimposed thereon. In this way, a toner image for the full-color image is formed on the intermediate transfer belt 67. Alternatively, a monochrome image such as a black image may be formed in the image forming apparatus 1.

Processes after Secondary Transfer

In the secondary transfer unit N, as described above, the toner image is transferred (secondarily transferred) from the intermediate transfer belt 67 onto a surface (first surface) of the sheet S. The sheet S is then conveyed to the fixing unit 45 by the pre-fixing conveyor belt 44. The toner image is fixed (melted and fastened) on the sheet S by the fixing unit 45, for example, under a predetermined pressure applied by rollers disposed opposite each other or a belt and heat emitted from a heat source, such as a heater.

The sheet S on which the image has been fixed is conveyed along the post-fixing conveyance path 59 by the inside discharge roller 46 until the sheet S has reached the discharge conveyance path 51 or the reverse guide path 52. Disposed at a branch between the discharge conveyance path 51 and the reverse guide path 52 is a flapper F1 (see FIG. 6), which selectively switches the conveyance path of the sheet S. When the sheet S is discharged from the image forming apparatus 1, the discharge conveyance path 51 is selected. When the front and back surfaces and the leading and trailing edges, in the conveyance direction, of the sheet S are reversed before the sheet S is discharged from the image forming apparatus 1 or when an image is formed on the back surface (second surface) of the sheet during the double-sided image formation, the reverse guide path 52 is selected.

After having been conveyed along the discharge conveyance path 51 by the inside discharge roller 46, the sheet S is discharged from the image forming apparatus 1 by the outside discharge roller 49. The discharge conveyance path 51 is coupled to the buffer path 81 disposed inside the buffer path unit 181 in the finisher 80. After having been conveyed by the outside discharge roller 49, the sheet S is sent to the processing unit 108 via the buffer path 81 and is then processed by the processing unit 108 as necessary. The sheet S is finally discharged to any one of the discharge stacking units **83*a* to 83*d* in the finisher 80**.

When an image is formed on the back surface of the sheet during the double-sided image formation, the sheet S is conveyed along the reverse guide path 52 and then conveyed by both the upper reverse roller pair 53 and the lower reverse roller pair 54, after which the sheet S is drawn into the switchback path 55. When the sheet S is drawn into the switchback path 55, the lower reverse roller pair 54 rotates in the opposite direction. The leading and trailing edges of the sheet S in the conveyance direction are thereby reversed (switchback operation). The sheet S is then conveyed to the double-sided conveyance path 47 by the lower reverse roller pair 54. After that, the sheet S is conveyed along the double-sided conveyance path 47 by the double-sided rollers **48*a* to 48*d* and returned to the supply conveyance path 41 in accordance with a timing at which the succeeding sheet S is being conveyed by the feed rollers 35 to 39. The sheet S is then sent to the secondary transfer unit N via the resist roller 42**. It should be noted that the image forming process performed on the back surface of the sheet S will not be described in detail because it is similar to that on the front surface described above.

When the sheet S is discharged from the image forming apparatus 1 after its front and back surfaces and the leading and trailing edges in the conveyance direction are reversed, the sheet S is drawn from the reverse guide path 52 to the switchback path 55 as in the case of forming an image on the second surface during the double-sided image formation. Then, both the upper reverse roller pair 53 and the lower reverse roller pair 54 rotate in the direction opposite to that at the time of drawing. As a result, the front and back surfaces and the leading and trailing edges, in the conveying direction, of the sheet S are reversed, after which the sheet S is discharged from the switchback path 55. The sheet S is discharged from the image forming apparatus 1 by the outside discharge roller 49 via the reverse discharge path 56 and is then sent to the buffer path 81 in the finisher 80 in the same manner as described above.

Configuration for Sheet Jam Removal Process

Figure 3:
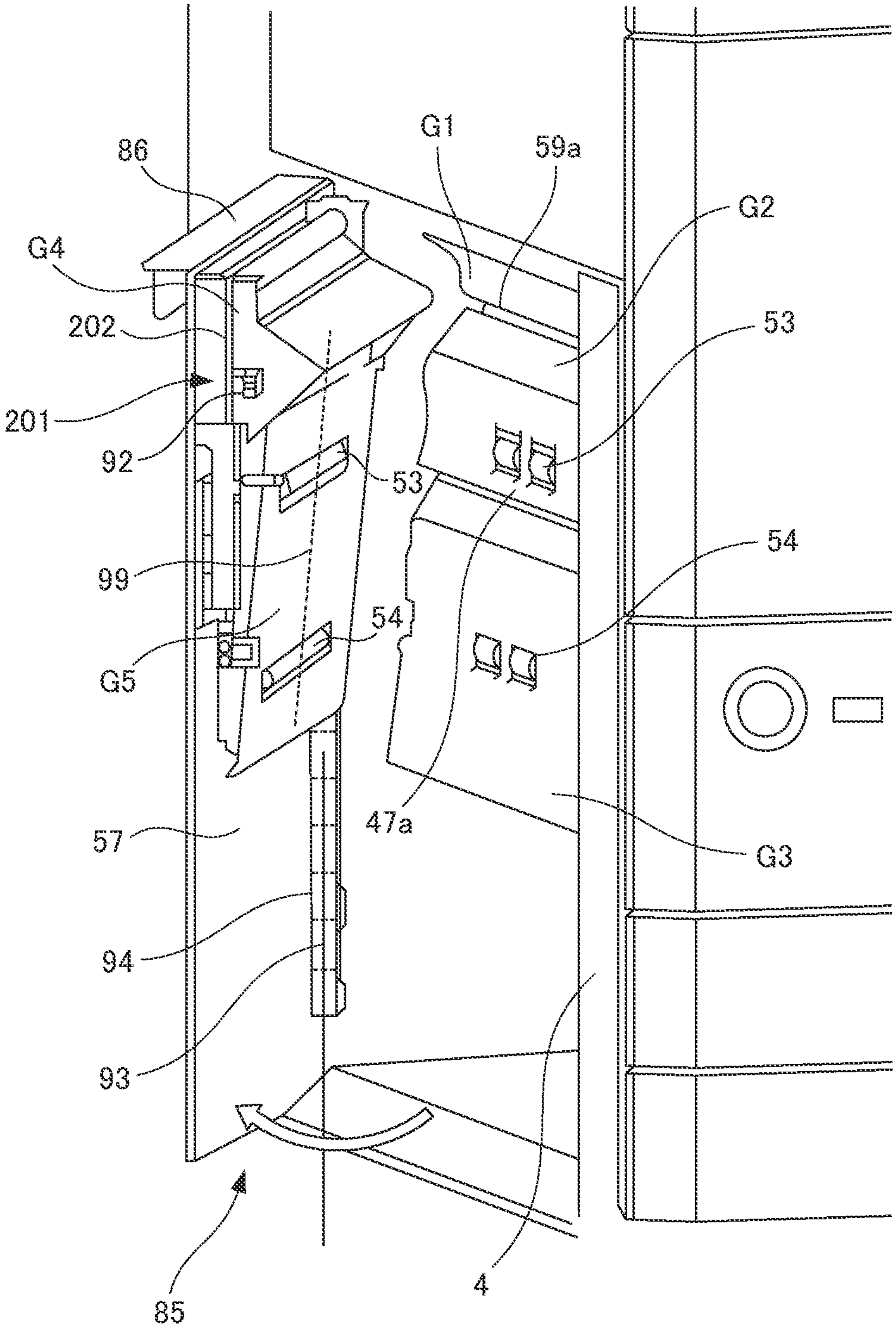
FIG. 3 is a perspective view of a side surface of an image forming apparatus according to the first embodiment with its reverse door open.

Next, a description will be given below of a configuration in which the sheet S jammed in the reverse unit 85 is removed therefrom. FIG. 3 is a perspective view of a side surface of the image forming apparatus according to the first embodiment with its reverse door open. It should be noted that FIG. 3 does not illustrate the finisher 80 for the purpose of facilitating understanding of the configuration of the reverse unit 85.

The left surface of the image forming apparatus 1, namely, the side surface adjacent to the reverse unit 85 is provided with a reverse door 57 as an opening/closing member. By the reverse door 57, the sheet conveyance path and the conveyance members in the reverse unit 85 can be exposed. A reverse door 57 is an example of the opening/closing member through which the sheet conveyance path along which the sheet S is to be guided in the sheet conveyance apparatus 2 is at least partly exposed to the outside of the image forming apparatus 1. The reverse door 57 is supported so as to be rotatable by an apparatus body 4 (a frame body of the apparatus body 4 in the present embodiment) in the image forming apparatus 1 via a hinge 94 disposed on the back side of the image forming apparatus 1. In the present embodiment, the reverse door 57 is rotatable around a rotation axis 93 disposed in the hinge 94 so as to extend substantially in the direction of gravity. In other words, the reverse door 57 is rotatable in a substantially horizontal direction around the rotation axis 93 on the back side of the image forming apparatus 1. Further, the reverse door 57 is disposed on the side surface of the apparatus body 4 which extends in the front-back direction. As described above, the opening/closing member is typically openable and closable by rotating around a rotation center positioned substantially parallel to a plane substantially orthogonal to the surfaces of the sheet conveyed along the sheet conveyance path. In the present embodiment, when rotating around the rotation axis 93 disposed so as to extend substantially in the direction of gravity, the opening/closing member can be set to two states: an open state and a closed state.

The apparatus body 4 contains one roller of the upper reverse roller pair 53 and one roller of the lower reverse roller pair 54. A guide G1, a guide G2, and a guide G3 are disposed, as a first guide, inside the apparatus body 4 in this order from the top when the reverse door 57 is closed, namely, in the closed state. The guide G1 forms a guide surface at a first side of the discharge conveyance path 51, which serves as a conveyance path. The guide G2 forms a guide surface at an end of the reverse guide path 52, which serves as a conveyance path. The outlet 59*a* is formed on the post-fixing conveyance path 59 between the guide G1 and the guide G2. The guide G3 forms a guide surface at a first side of the switchback path 55, which serves as a conveyance path. The inlet 47*a* is formed on the double-sided conveyance path 47 between the guide G2 and the guide G3.

The reverse door 57 contains the other roller of the upper reverse roller pair 53 and the other roller of the lower reverse roller pair 54. A guide G4 and a guide G5 are disposed, as a second guide, on the inner surface of the reverse door 57 in this order from the top. The guide G4 forms a guide surface at second sides of the discharge conveyance path 51 and the reverse guide path 52, each of which serves as a conveyance path. The guide G5 forms a guide surface at a second side of the switchback path 55, which serves as a conveyance path. The reverse discharge path 56 (see FIG. 1) is formed inside the guide G4.

As illustrated in FIG. 3, by rotating the reverse door 57 so as to enter the open state, the pair of rollers of each of the upper reverse roller pair 53 and the lower reverse roller pair 54 are moved away from each other. In addition, by rotating the reverse door 57 so as to open, the discharge conveyance path 51, the reverse guide path 52, and the switchback path 55 can be exposed. In this state, the sheet S jammed close to the outlet 59*a* of the post-fixing conveyance path 59, in the discharge conveyance path 51, in the reverse guide path 52, in the switchback path 55, in the reverse discharge path 56, or close to the inlet 47*a* of the double-sided conveyance path 47 can be removed (the sheet jam removal process can be performed).

The reverse door 57 has a lock mechanism 201 that locks the reverse door 57 in a closed position. The lock mechanism 201 includes: a hook shaft 202 disposed on the reverse door 57 so as to be rotatable; and a hook 92 and a handle 91 (FIG. 4), both of which are fixed to the hook shaft 202. The hook 92 can engage with a positioning pin (not shown) disposed in the apparatus body 4, thereby locking the reverse door 57 in the closed position. When the operator operates the handle 91 to rotate the hook shaft 202 in the direction in which it is released, the hook 92 becomes disengaged from the positioning pin so that the reverse door 57 opens to enter the open state. When the operator closes the reverse door 57 to enter the closed state, the hook 92 automatically becomes engaged with the positioning pin, thereby locking the reverse door 57.

Figure 4:
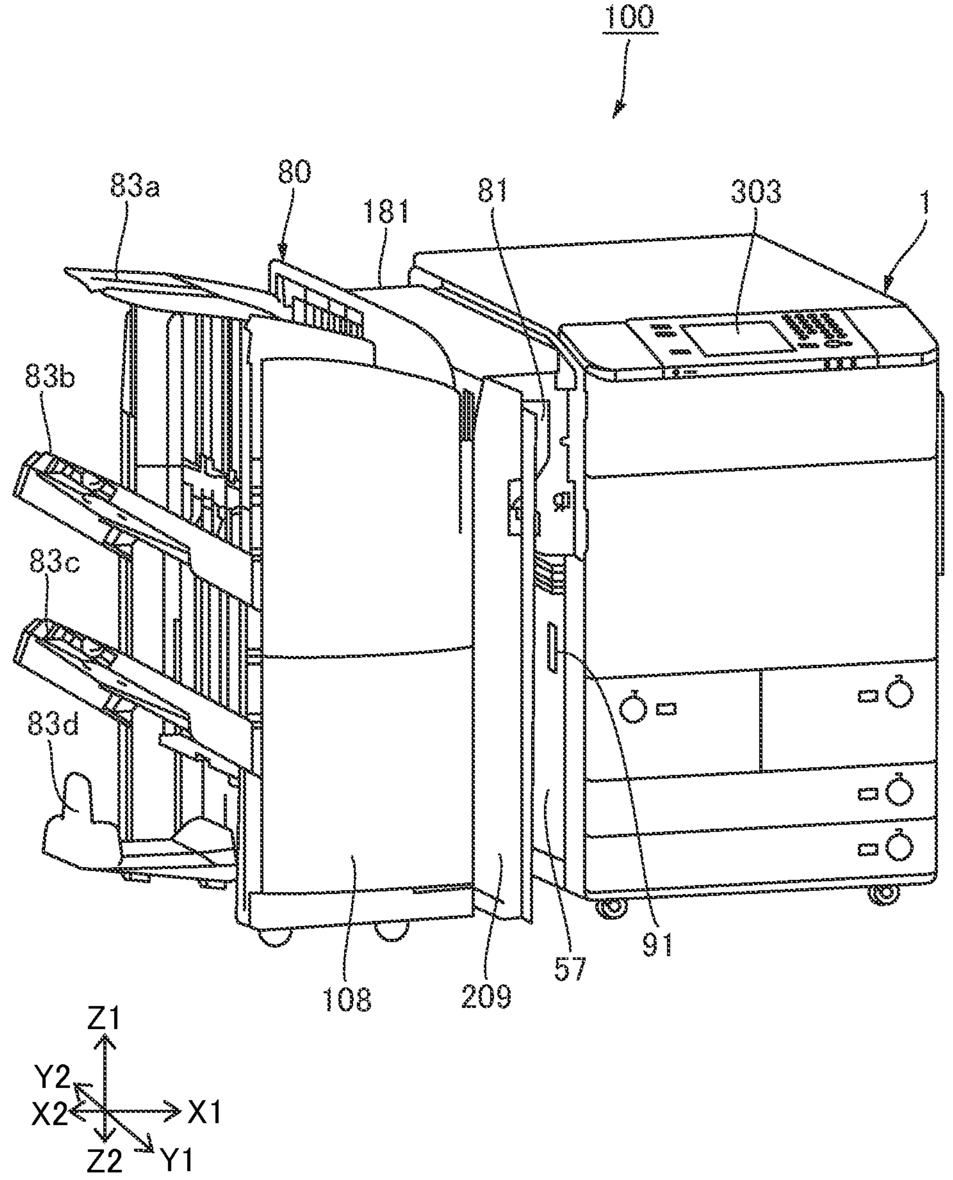
FIG. 4 is a perspective view of the image forming system according to the first embodiment with its exterior covers open.

Before performing the operation of opening the reverse door 57 to enter the open state during a sheet jam removal process, the operator needs to open an exterior cover 209, as illustrated in FIG. 4. The exterior cover 209 is disposed, as a cover member, on the front surface of the buffer path unit 181 in the finisher 80. More specifically, the exterior cover 209 is disposed so as to be openable and closable. When the exterior cover 209 is open, the side surface of the apparatus body 4 on which reverse door 57 is disposed is exposed. The buffer path 81 is disposed above the reverse door 57, whereas the processing unit 108 is disposed on the left side of the reverse door 57. The back surface of the buffer path unit 181 is covered with a side plate or an exterior cover (not illustrated). In the present embodiment, as described above, the reverse door 57 is configured to be openable and closable even when the finisher 80 is attached to the image forming apparatus 1. Because of the presence of the processing unit 108 on the left side of the reverse door 57, however, the angle (rotatable angle) at which the reverse door 57 can open or close is limited to only about 30 degrees. Thus, even when the reverse door 57 is open, the space (open space) in which the sheet jam removal process is to be performed is small. Furthermore, because of the elements in the finisher 80 on the upper and left sides of the reverse door 57, light can enter the inner space of buffer path unit 181 substantially only from the front side even when the reverse door 57 is open.

Illumination Device According to First Embodiment

Figure 5B:
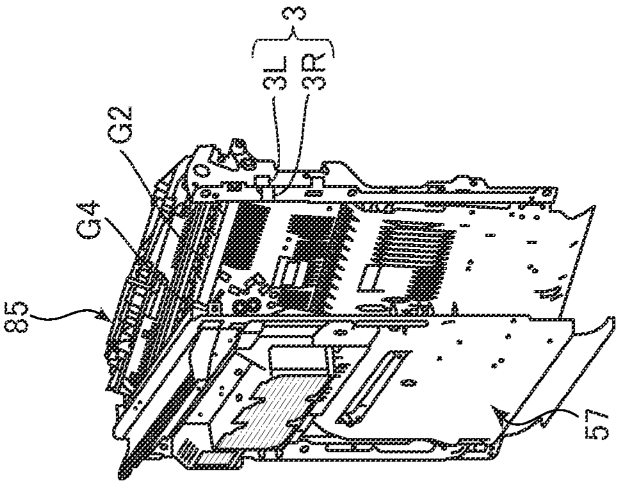
FIG. 5B is a perspective view of the reverse unit according to the first embodiment with the reverse door open.
Figure 5A:
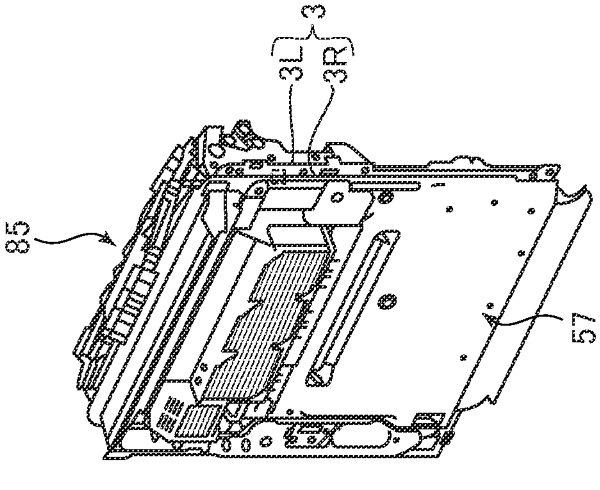
FIG. 5A is a perspective view of a reverse unit according to the first embodiment with the reverse door closed.
Figure 6:
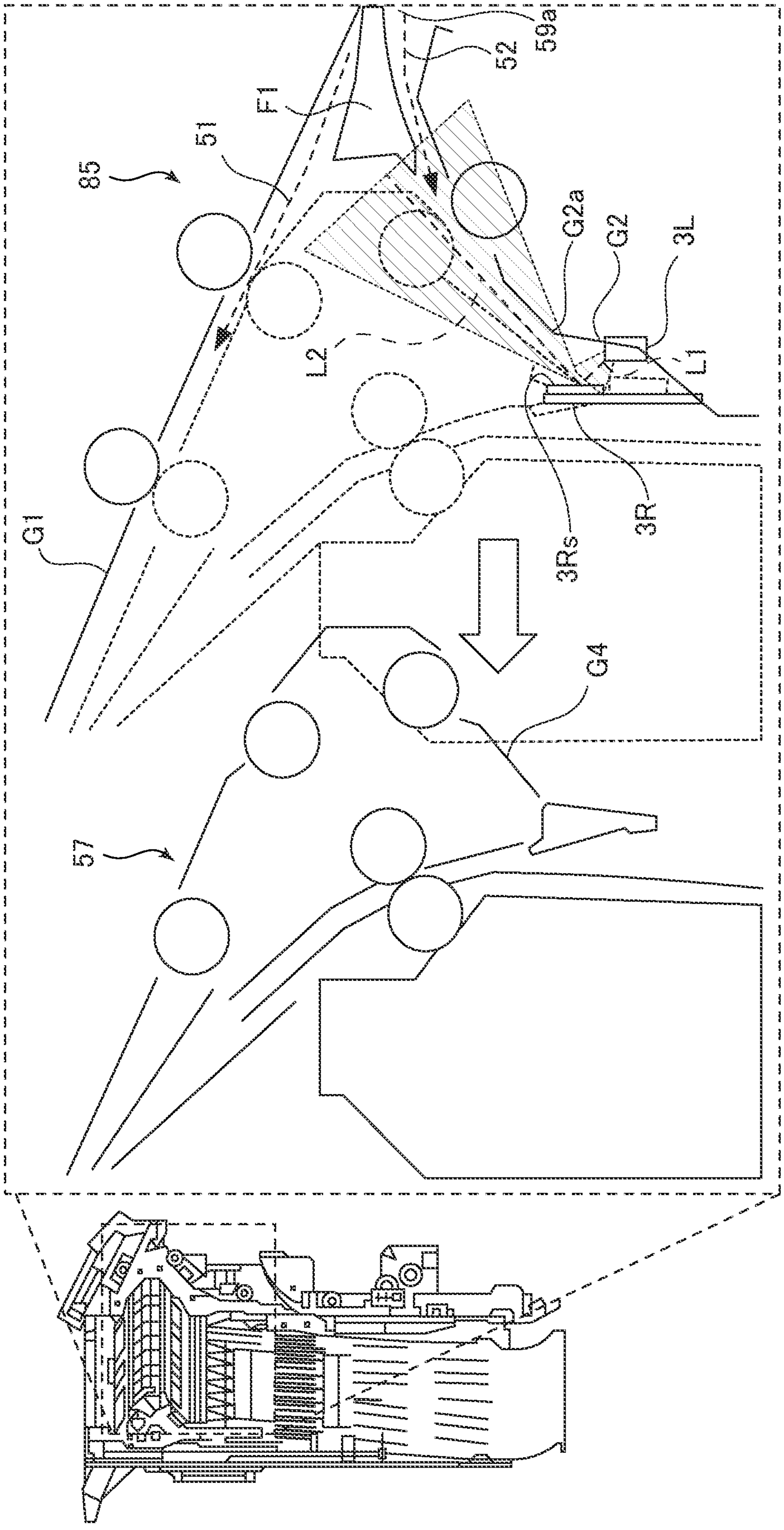
FIG. 6 is a cross-sectional view of the reverse unit with the reverse door according to the first embodiment open, as viewed from the front.
Figure 7A:
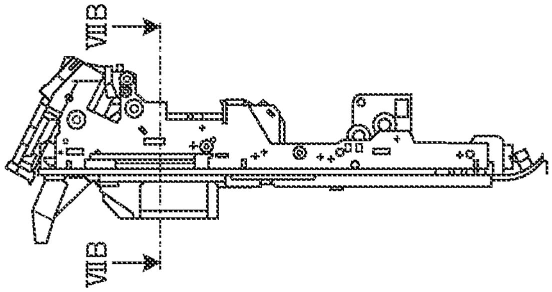
FIG. 7A is a cross-sectional view of the reverse unit with the reverse door according to the first embodiment closed, as viewed from the top.
Figure 7B:
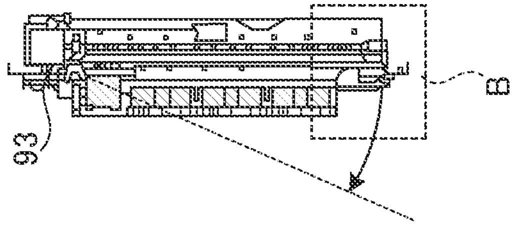
FIG. 7B is a cross-sectional view taken along an arrow VIIB-VIIB in FIG. 7A.
Figure 7C:
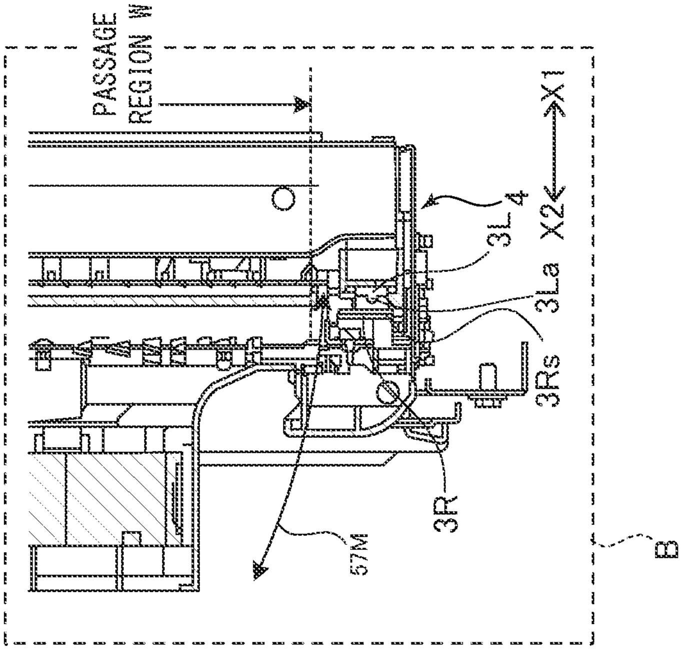
FIG. 7C is an enlarged cross-sectional view of an area B in FIG. 7B.
Figure 8A:
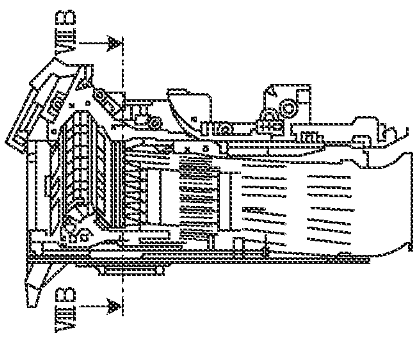
FIG. 8A is a cross-sectional view of the reverse unit with the reverse door according to the first embodiment open, as viewed from the top.
Figure 8B:
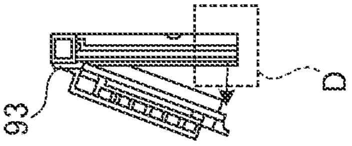
FIG. 8B is a cross-sectional view taken along an arrow in FIG. 8A.
Figure 8C:
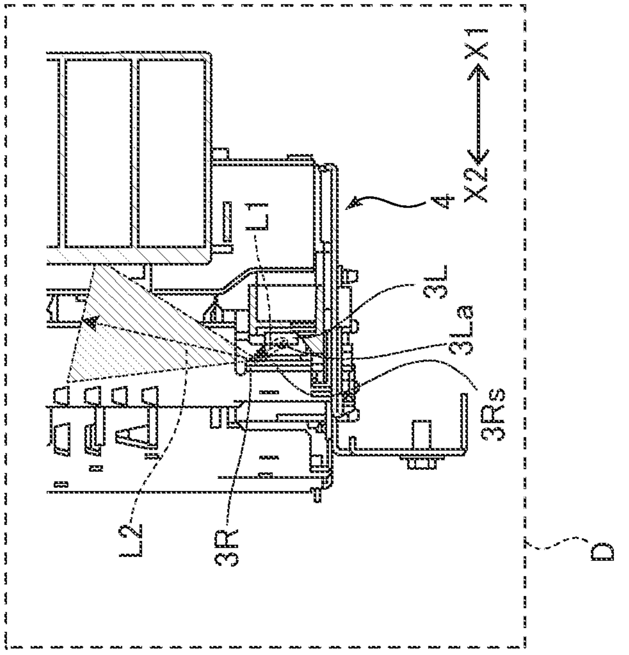
FIG. 8C is an enlarged cross-sectional view of an area D in FIG. 8B.
Figure 9:
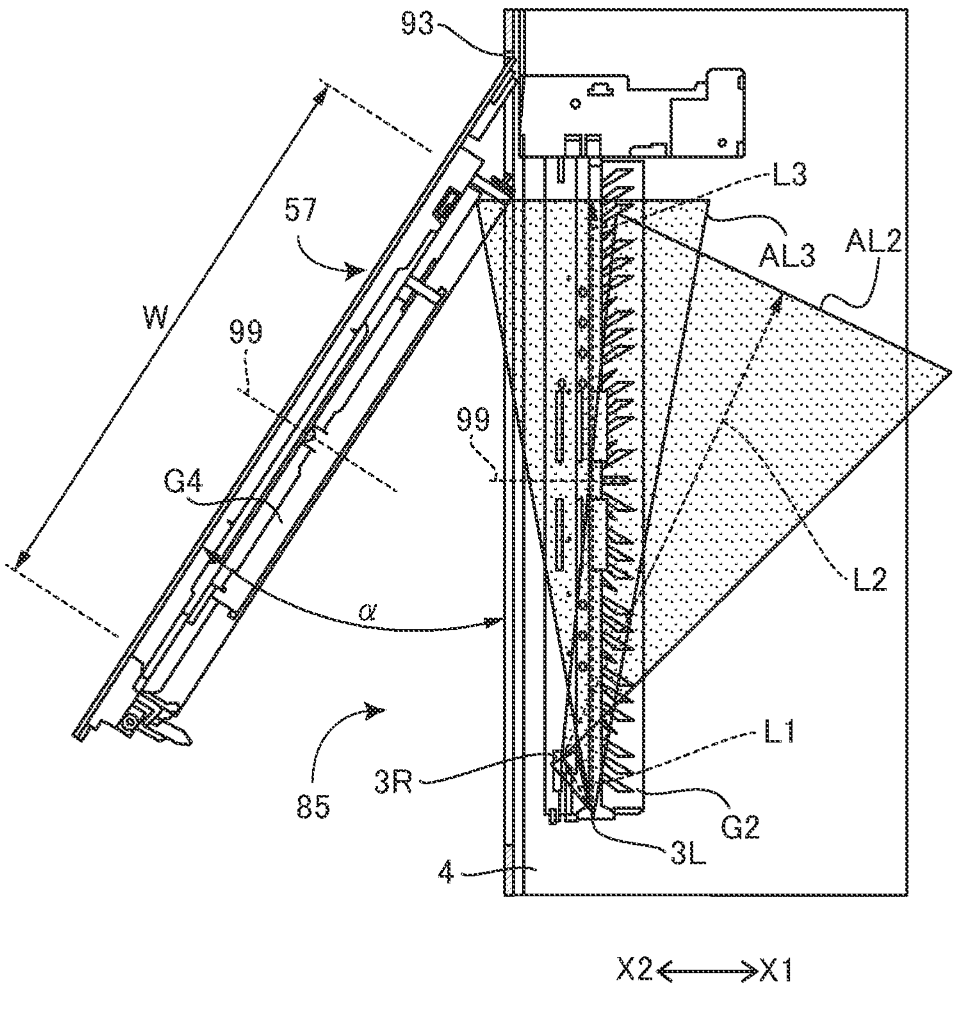
FIG. 9 is a schematic cross-sectional view of a light irradiation direction in the reverse unit with the reverse door according to the first embodiment open, as viewed from the top.

Next, a description will be given below of an illumination device that illuminates conveyance paths and guides when the reverse door 57 in the first embodiment is open, with reference to FIGS. 5A, 5B, 6, 7A, 7B, 7C, 8A, 8B, 8C, and 9. FIG. 5A is a perspective view of a reverse unit according to the first embodiment with the reverse door closed. FIG. 5B is a perspective view of a reverse unit according to the first embodiment with the reverse door open. FIG. 6 is a cross-sectional view of the reverse unit with the reverse door according to the first embodiment open, as viewed from the front. FIG. 7A is a cross-sectional view of the reverse unit with the reverse door according to the first embodiment closed, as viewed from the top. FIG. 7B is a cross-sectional view taken along an arrow VIIB-VIIB in FIG. 7A. FIG. 7C is an enlarged cross-sectional view of an area B in FIG. 7B. FIG. 8A is a cross-sectional view of the reverse unit with the reverse door according to the first embodiment open, as viewed from the top. FIG. 8B is a cross-sectional view taken along an arrow in FIG. 8A. FIG. 8C is an enlarged cross-sectional view of an area D in FIG. 8B. FIG. 9 is a schematic cross-sectional view of a light irradiation direction in a reverse unit with a reverse door according to the first embodiment open, as viewed from the top.

When the finisher 80 is connected to the image forming apparatus 1, as described above, the angle at which the reverse door 57 can open or close is limited to a predetermined angle $\alpha$ (see FIG. 9). In addition, light can enter the inner space of the buffer path unit 181 only from the front, which is exposed by opening the reverse door 57. As a result, the operator may have trouble viewing the sheet S jammed in an exposed portion of a conveyance path. In some cases, only a leading portion of the sheet S is jammed in the reverse guide path 52, in other words, the sheet S is jammed in both the post-fixing conveyance path 59 (see FIG. 1) and the reverse guide path 52. When a sheet jam occurs as in such cases, the operator may have trouble viewing the sheet S jammed in the conveyance paths (especially, the reverse guide path 52) due to darkness even when opening the reverse door 57 so as to enter the open state during the sheet jam removal process. This is because the exposed space is partly hidden by both the finisher 80 and the reverse door 57. As a result, the sheet jam removal process is difficult to perform.

In the first embodiment, as illustrated in FIGS. 5A and 5B, an illumination device 3 that illuminates sheet conveyance paths (especially, the reverse guide path 52) is disposed inside the apparatus body 4 in the front of a conveyance center 99, which is positioned at the center of the conveyance paths in a width direction. More specifically, as illustrated in FIGS. 7A, 7B, and 7C, the illumination device 3 is disposed in the front of a rotational locus 57M created by a leading portion of the reverse door 57 and in front of the passage region W (see FIG. 7C) through which the sheet S passes when the reverse door 57 is closed, or in the closed state. In short, the illumination device 3 is disposed so as not to interfere with opening and closing of the reverse door 57 and conveying of the sheet S. As described above, the rotation axis 93 is disposed so as to extend in the vertical direction and positioned on a first side in the width direction with respect to the conveyance center 99, more preferably positioned on a first side in the width direction with respect to the passage region W through which the sheet S passes, the width direction being orthogonal to the conveyance direction of the sheet S. In other words, the rotation axis 93 is disposed closer to the first side in the width direction than the passage region W. Moreover, the illumination device 3 is disposed on a second side in the width direction with respect to the conveyance center 99, more preferably positioned on a second side in the width direction with respect to the passage region W for the sheet S. In other words, the illumination device 3 is disposed closer to the second side in the width direction than the passage region W is.

As illustrated in FIG. 7C, the illumination device 3 includes: an LED substrate 3L, as a light source, that has an LED 3La that emits light; and a reflection unit 3R which is disposed opposite the LED substrate 3L and has a surface to which a reflection sheet 3Rs is bonded. The LED substrate 3L is fixedly mounted on the apparatus body 4 in order to supply a current from a power supply. The LED substrate 3L is disposed such that, when the reverse door 57 is open, or in the open state, it emits light from the apparatus body 4 toward the outside of the side on which the reverse door 57 is disposed.

The reflection sheet 3Rs in the reflection unit 3R may be an aluminum reflection sheet, which has glossiness and effectively reflects light, more specifically has a reflectance of 80% or more. In this case, if someone, such as a user, accidentally touches the LED substrate 3L, the LED substrate 3L may be damaged by static electricity. For this reason, the reflection sheet 3Rs and the LED substrate 3L are arranged such that a distance therebetween is equal to 6 mm or less, namely, such that a gap therebetween is so small that even a child cannot insert his/her finger into it.

As illustrated in FIG. 6, when the reverse door 57 is opened with respect to the reverse unit 85 in the apparatus body 4, the guide G4 disposed opposite both the guides G1 and G2 are moved away from both the guides G1 and G2, so that both the discharge conveyance path 51 and the reverse guide path 52 are exposed. In this state, if the reflection unit 3R is absent, for example, the light from the LED substrate 3L may travel along an optical axis L1 toward the guide G4 in the reverse door 57. Then, the light directly from the LED substrate 3L may be blocked by a curved portion G2*a* of the guide G2 and accordingly may fail to strike the flapper F1 disposed at the branch between the discharge conveyance path 51 and the reverse guide path 52 and above the LED substrate 3L and an area around the outlet 59*a* of the post-fixing conveyance path 59. In this case, the light directly from the LED substrate 3L may travel along an optical axis L3 parallel to a lower side of the guide G2 toward an irradiation range AL3, as illustrated in FIG. 9. However, the light may fail to strike an upstream portion, in the sheet conveyance direction, of the reverse guide path 52 above the curved portion G2*a*, the flapper F1, and an area around the outlet 59*a* of the post-fixing conveyance path 59. In the first embodiment, the reflection unit 3R is, therefore, disposed in order to irradiate both the discharge conveyance path 51 and the reverse guide path 52 with the light from the LED substrate 3L.

As illustrated in FIGS. 8A, 8B, and 8C, when the illumination device 3 disposed in the front of the sheet conveyance path emits light along the optical axis L1, this light is reflected by the reflection unit 3R and then travels along the optical axis L2. As illustrated in FIGS. 8C and 9, the reflected light that has traveled along the optical axis L2 further travels within an irradiation range AL2 in the arrow Y2 direction (see FIG. 2), which is a direction from the front side to the back side of the image forming apparatus 1, namely, a direction from a side farther from the rotation axis 93 to a side closer to the rotation axis 93 while irradiating. After that, the light that has been reflected to within the irradiation range AL2 by the reflection unit 3R is directed to the guide surface of the reverse guide path 52 disposed in the guide G2 of the reverse unit 85 in the apparatus body 4. In this case, the light traveling within the irradiation range AL2 is also directed to the upstream portion, in the sheet conveyance direction, of the reverse guide path 52 above the curved portion G2*a*, the flapper F1, and the area around the outlet 59*a* of the post-fixing conveyance path 59.

In the first embodiment, as described above, the reflection unit 3R reflects the light from the LED substrate 3L of the illumination device 3, thereby brightly illuminating both the discharge conveyance path 51 and the reverse guide path 52 without backlighting them. This configuration irradiates, especially the branch between the discharge conveyance path 51 and the reverse guide path 52 which is positioned deeply apart in the right direction from the reverse door 57 and the depth of an inner space of the image forming apparatus 1 which is positioned close to the rotation axis 93. As a result, even if a portion of the sheet S is jammed or a fragment of a jammed and removed sheet S is left in an upstream portion of the reverse guide path 52 in the conveyance direction of the sheet S, for example, the operator can easily view it. Consequently, it is possible to provide improved visibility during a sheet jam removal process and to promptly recover from downtime resulting from the sheet jam removal process.

Second Embodiment

Figure 10:
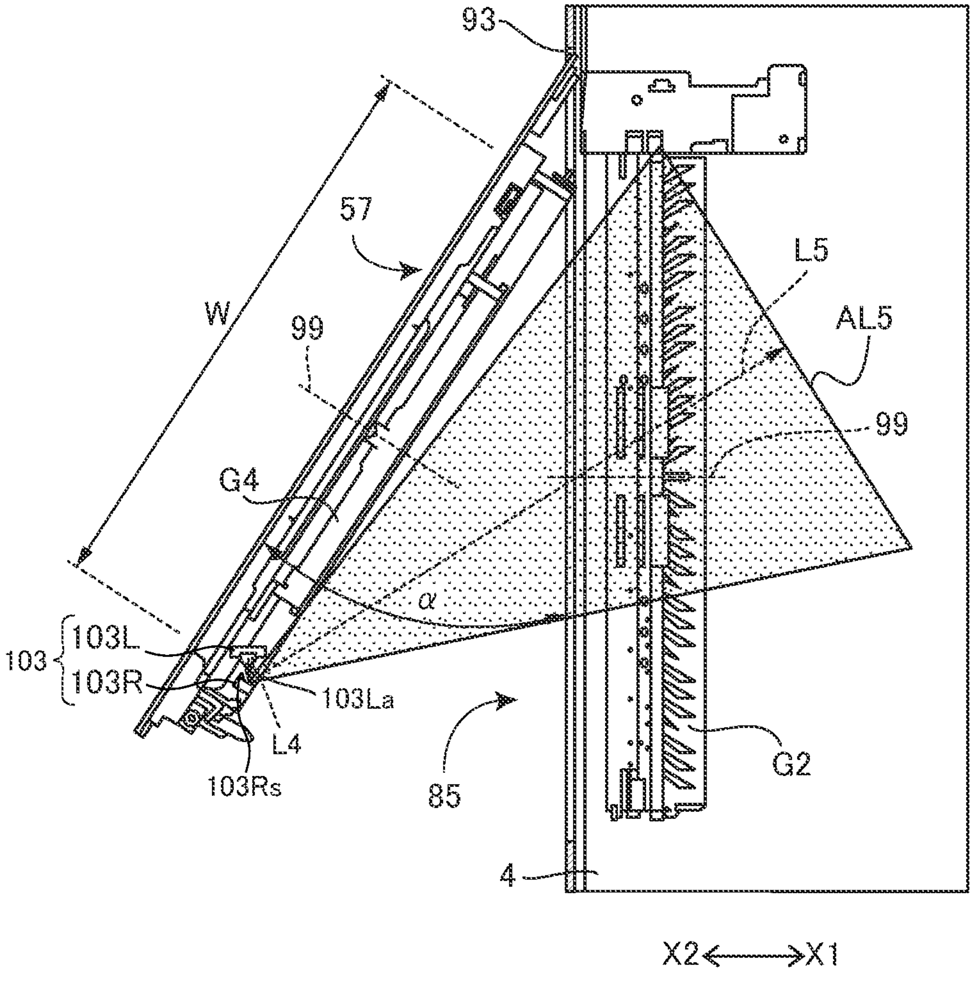
FIG. 10 is a schematic cross-sectional view of a light irradiation direction in a reverse unit with a reverse door according to a second embodiment open, as viewed from the top.

Next, a description will be given below of a second embodiment, which is conceived by partially modifying the foregoing first embodiment, with reference to FIG. 10. FIG. 10 is a schematic cross-sectional view of a light irradiation direction in a reverse unit with a reverse door according to a second embodiment open, as viewed from the top. In the foregoing first embodiment, the illumination device 3 is disposed on the apparatus body 4, whereas in the second embodiment, an illumination device 103 is disposed on a reverse door 57.

In the second embodiment, as illustrated in FIG. 10, the illumination device 103 that illuminates sheet conveyance paths (especially, a reverse guide path 52) is disposed inside the reverse door 57 in the front of the conveyance center 99, which is positioned at the center of the conveyance paths in the width direction. In addition, a rotation axis 93 is disposed so as to extend in the vertical direction and positioned on a first side with respect to the conveyance center 99 in the width direction, which is orthogonal to the sheet conveyance direction. The illumination device 103 is disposed on a second side with respect to the conveyance center 99 in the width direction.

Similar to the illumination device 3 in the first embodiment, the illumination device 103 includes an LED substrate 103L, as a light source, that has an LED 103La that emits light; and a reflection unit 103R that is disposed opposite the LED substrate 103L and has a surface to which a reflection sheet 103Rs is bonded. The LED substrate 103L is fixedly mounted on the reverse door 57 in order to supply a current from a power source. The LED substrate 103L is disposed such that, when the reverse door 57 is open, or in the open state, it emits light from the reverse door 57 toward the outside of the side on which an apparatus body 4 is disposed.

The reflection unit 103R is disposed closer to the apparatus body 4 than the LED substrate 103L.

When the illumination device 103 emits light along an optical axis L4, this light is reflected by the reflection unit 103R and then travels along an optical axis L5. This reflected light, which has traveled along the optical axis L5, further travels within an irradiation range AL5 in the arrow Y2 direction (see FIG. 2), which is a direction from the front side to the back side of the image forming apparatus 1, namely, a direction from a far side to a near side with respect to the rotation axis 93. After that, the light that has been reflected to within the irradiation range AL5 by the reflection unit 3R is directed to the guide surface of the reverse guide path 52 disposed in a guide G2 of the reverse unit 85 in an apparatus body 4. In this case, the light traveling within the irradiation range AL5 is also directed to an upstream portion, in the conveyance direction of the sheet S, of the reverse guide path 52 above a curved portion G2*a*, a flapper F1, and an area around an outlet 59*a* of a post-fixing conveyance path 59.

In the second embodiment, as described above, the illumination device 103 is disposed in the reverse door 57. With the reflection unit 103R disposed therein, the light from the LED substrate 103L can be directed to both the discharge conveyance path 51 and the reverse guide path 52 disposed deep inside the apparatus body 4. As described above, the illumination device 103 is disposed on the reverse door 57 in the front of the conveyance center 99. This configuration can brightly irradiate both the discharge conveyance path 51 and the reverse guide path 52 without backlighting them. In the second embodiment, the distances from the illumination device 103 to the discharge conveyance path 51 and from the illumination device 103 to the reverse guide path 52 are longer than those in the foregoing first embodiment. The irradiation range can be wider accordingly. As a result, even if a portion of the sheet S is jammed or a fragment of a jammed and removed sheet S is left in an upstream portion of the reverse guide path 52 in the conveyance direction of the sheet S, for example, the operator can easily view it. Consequently, it is possible to provide improved visibility during a sheet jam removal process and to promptly recover from downtime resulting from the sheet jam removal process.

Other configurations, operations, and effects of the second embodiment are substantially the same as those of the first embodiment and thus will not be described.

Potentiality of Other Embodiments

In the foregoing first and second embodiments, the reverse door 57 is opened in the reverse unit 85 as an opening/closing member used for the sheet jam removal process. In addition, the illumination device 3 (103) irradiates the guide G2 (reverse guide path 52). However, the opening/closing member is not limited to such a reverse door. Alternatively, the opening/closing member may be any member that can open or close with respect to the image forming apparatus to expose a predetermined conveyance path therein. In this case, for example, even if the opening/closing member is disposed on the front surface of the image forming apparatus, the "first side" in a case where the opening/closing member is opened corresponds to the side closer to the rotation axis, which is the rotation center of the opening/closing member, whereas the "second side" corresponds to the side farther from the rotation axis.

In the foregoing first and second embodiments, "the first side" and "second side" are defined relative to the rotation axis that serves as the rotation center of the opening/closing member; however, such definitions are not limited. Even if an image forming apparatus employs a structure in which a rotational axis is disposed so as to extend in the horizontal direction and an opening/closing member opens or closes in the vertical direction, as long as the opening/closing member is disposed on a surface of the image forming apparatus, the back side corresponds to "first side" and the front side corresponds to "second side", as viewed from the front surface. Even in this case, a member that covers an area around the opening/closing member is disposed; an exterior cover is disposed on the front side (see FIG. 4); and it is necessary to open the exterior cover before opening the opening/closing member. As a result, the back "depth" area obviously becomes dark. This structure accordingly causes an illumination device having a reflection unit to direct light from the front toward the back, thereby successfully providing improved visibility of the depth portions of guides.

In the foregoing first and second embodiments, the reflection unit is provided with the reflection sheet 3Rs made of aluminum; however, the configuration of the reflection unit is not limited. Alternatively, for example, the reflection unit may be a member in which the surface of a guide member is coated so that the member has sufficiently high reflectance (e.g., a white plate having a reflectance of 50% or more) to reflect the light from the illumination device 3. Furthermore, the reflection unit may be coated so as to better diffuse light, thereby providing a wider irradiation range.

In addition, in the foregoing first and second embodiments, the finisher 80 is disposed adjacent to and connected to, as an optional unit, the side surface of the image forming apparatus from which a sheet is to be ejected; however, the optional unit is not limited to the finisher 80. Alternatively, as the optional unit, for example, a sheet feeding device that feeds a sheet to the image forming apparatus 1 may be connected adjacent to the right side surface of the image forming apparatus 1 in FIG. 1. In this case, when the optional unit is attached to the right side surface of the image forming apparatus 1, for example, an opening/closing member via which the sheet conveyance path and the conveyance member of the sheet feeding unit 101 inside the image forming apparatus 1 are exposed may be provided. In addition, an illumination device that is the same as that of the foregoing first and second embodiments is disposed in the opening/closing member. This can also produce substantially the same effects as described above.

In the foregoing first and second embodiments, the opening/closing member is opened before the sheet jam removal process is performed, and then the illumination device irradiates a guide (conveyance path). However, the opening/closing member may also be opened in order for a user to perform other processes, such as replenishment of toner, replacement and cleaning of components, and cleaning are performed. Even in this case, the illumination device may also irradiate areas in which such processes are to be performed, thereby improving the workability.

In the foregoing first and second embodiments, the illumination device is disposed on the apparatus body 4 or the reverse door 57 (opening/closing member) in the image forming apparatus 1. However, the configuration of the illumination device is not limited. Alternatively, for example, the illumination device may be disposed in the optional unit. Even in this case, the illumination device can also produce substantially the effects as described above by directing light from the front toward the back. An image forming system typically includes: an image forming apparatus that forms an image on a sheet; and a processing device that is detachably attached to the image forming apparatus and conveys the sheet with the image thereon discharged from the image forming apparatus. The image forming system also includes: an opening/closing member that is disposed in the image forming apparatus and openable or closable inside a space between the image forming apparatus and the processing device; an illumination device disposed in a front portion of the image forming apparatus; and a reflection member that reflects light from the illumination device. When the opening/closing member is opened, the illumination device preferably irradiates a wide area around an exposed portion of a conveyance path.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-142112, filed Sep. 7, 2022, which is hereby incorporated by reference herein in its entirety.

What is claimed is:

1. A sheet conveyance apparatus comprising:

an apparatus body including a first guide configured to form a conveyance path along which a sheet to be conveyed is guided;

an opening/closing member including a second guide disposed opposite the first guide and configured to form the conveyance path, the opening/closing member being openable and closable with respect to the apparatus body around a rotation axis;

a light source configured to emit light; and a reflection unit configured to reflect light from the light source, wherein the light source and the reflection unit are disposed such that, in an open state where the opening/closing member is open to expose the conveyance path, the first guide is irradiated, in a direction from a side farther from the rotation axis to a side closer to the rotation axis, with the light reflected by the reflection unit.

2. The sheet conveyance apparatus according to claim 1, wherein the light source and the reflection unit are disposed in the apparatus body.

3. The sheet conveyance apparatus according to claim 2, wherein the rotation axis is disposed so as to extend in a vertical direction, and the rotation axis is disposed on a first side with respect to a center of the conveyance path in a width direction, the width direction being orthogonal to a sheet conveyance direction, and the light source and the reflection unit are disposed on a second side with respect to the center of the conveyance path in the width direction.

4. The sheet conveyance apparatus according to claim 2, wherein the rotation axis is disposed so as to extend in a vertical direction, the rotation axis is disposed closer to a first side in a width direction than a passage region of a sheet in the conveyance path within the first guide is, the width direction being orthogonal to a sheet conveyance direction, and the light source and the reflection unit are disposed closer to a second side in the width direction than the passage region.

5. The sheet conveyance apparatus according to claim 2, wherein the light source is disposed so as to emit the light from the apparatus body toward a side on which the opening/closing member is disposed in the open state in which the opening/closing member is open, and the reflection unit is disposed closer to the opening/closing member than the light source in the apparatus body.

6. The sheet conveyance apparatus according to claim 1, wherein the light source and the reflection unit are disposed in the opening/closing member.

7. The sheet conveyance apparatus according to claim 6, wherein the rotation axis is disposed so as to extend in a vertical direction, the rotation axis is disposed on a first side with respect to a center of the conveyance path in a width direction, the width direction being orthogonal to a sheet conveyance direction, and the light source and the reflection unit are disposed on a second side with respect to the center of the conveyance path in the width direction.

8. The sheet conveyance apparatus according to claim 6, wherein the reflection unit is disposed closer to the apparatus body than the light source.

9. The sheet conveyance apparatus according to claim 1, wherein the light source and the reflection unit are disposed such that a distance therebetween is equal to 6 mm or less.

10. The sheet conveyance apparatus according to claim 1, wherein the reflection unit has a light reflectance of 50% or more.

11. The sheet conveyance apparatus according to claim 1, further comprising an operation unit configured to receive an operational input of information, the operation unit being disposed in a front portion of the apparatus body, wherein the opening/closing member is disposed on a side surface of the apparatus body which extends in a front-back direction of the apparatus body.

12. A sheet conveyance apparatus comprising:

an apparatus body including a first guide configured to form a conveyance path along which a sheet to be conveyed is guided;

an opening/closing member including a second guide disposed opposite the first guide and configured to form the conveyance path, the opening/closing member being openable and closable with respect to the apparatus body;

a light source configured to emit light;

a reflection unit configured to reflect the light from the light source; and an operation unit configured to receive an operational input of information, the operation unit being disposed in a front portion of the apparatus body, wherein in an open state where the opening/closing member is open to expose the conveyance path, the first guide is irradiated, in a direction from a front side to a back side of the apparatus body, with the light reflected by the reflection unit.

13. An image forming apparatus comprising:

the sheet conveyance apparatus according to claim 1; and an image forming unit configured to form an image on a sheet.

14. An image forming system comprising:

the image forming apparatus according to claim 13; and a processing device configured to process a sheet discharged from the image forming apparatus, wherein the processing device includes a cover member that is disposed so as to be openable and closable and, in a case where the cover member is open, exposes a side surface of the apparatus body on which the opening/closing member is disposed.

* * * * *